United States Patent
Yang et al.

(10) Patent No.: US 9,447,741 B2
(45) Date of Patent: Sep. 20, 2016

(54) AUTOMATIC ENGINE START-STOP CONTROL

(71) Applicant: Ford Global Technologies, LLC, Dearborn, MI (US)

(72) Inventors: Hsin-hsiang Yang, Ann Arbor, MI (US); Kwaku O. Prakah-Asante, Commerce Township, MI (US); Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 14/158,769

(22) Filed: Jan. 17, 2014

(65) Prior Publication Data

US 2015/0204253 A1   Jul. 23, 2015

(51) Int. Cl.
*F02N 11/08* (2006.01)
*F02D 29/02* (2006.01)

(52) U.S. Cl.
CPC .................................. *F02D 29/02* (2013.01)

(58) Field of Classification Search
CPC .... F02D 41/042; F02D 41/06; F02D 41/062; F02D 29/02; F02N 11/0814; F02N 11/0833; F02N 11/0837; F02N 2200/125
USPC ..................... 701/112, 113; 123/179.3, 179.4
See application file for complete search history.

(56) References Cited

U.S. PATENT DOCUMENTS

| | | | |
|---|---|---|---|
| 5,451,820 A | 9/1995 | Gotoh et al. | |
| 7,212,906 B2 | 5/2007 | Arai et al | |
| 7,354,379 B2* | 4/2008 | Moriya | F02N 11/0833 477/199 |
| 7,831,369 B2* | 11/2010 | Naik | B60K 31/0008 340/435 |
| 7,853,401 B2 | 12/2010 | Hoetzer | |
| 8,532,843 B2* | 9/2013 | Nagura | F02N 11/0837 123/179.4 |
| 2003/0029406 A1* | 2/2003 | Weiss | F02D 41/065 123/179.4 |
| 2006/0142121 A1 | 6/2006 | Moriya | |
| 2009/0147996 A1 | 6/2009 | Peng et al. | |
| 2010/0176970 A1 | 7/2010 | Takafuji et al. | |
| 2015/0206430 A1* | 7/2015 | Yang | G08G 1/166 340/435 |

FOREIGN PATENT DOCUMENTS

| | | |
|---|---|---|
| JP | H08293100 | 11/1996 |
| JP | 2008290498 | 12/2008 |

* cited by examiner

*Primary Examiner* — Hai Huynh
(74) *Attorney, Agent, or Firm* — Frank MacKenzie; Bejin Bieneman PLC

(57) ABSTRACT

A vehicle system having at least one sensor configured to output a range signal and a range-rate signal. The range signal represents a distance from a host vehicle to the front vehicle and the range-rate signal represents range-rate information of the front vehicle relative to the host vehicle. A processing device is configured to output a control signal based on the range signal and the range-rate signal. The control signal commands an engine of the host vehicle to start.

20 Claims, 4 Drawing Sheets

AUTOMATIC ENGINE START-STOP CONTROL

BACKGROUND

Turning off a vehicle engine when the vehicle comes to a stop can improve fuel economy and reduce emissions. Ideally, the engine would be started again before a power demand is made by the driver. Some ways to anticipate the driver's power demand include when the driver presses the accelerator pedal (for vehicles with automatic transmissions) or when the driver actuates the clutch and gear shifter (for vehicles with manual transmissions). Restarting the engine before the power demand is made balances quickly responding to the driver's power demand with providing improved fuel economy and reduced emissions relative to vehicles where the engine runs continuously during operation of the vehicle.

DETAILED DESCRIPTION

An exemplary vehicle system includes at least one sensor configured to output a range signal and a range-rate signal. The range signal represents a distance from a host vehicle to the front vehicle and the range-rate signal represents range-rate information of the front vehicle relative to the host vehicle. A processing device is configured to output a control signal based on the range signal and the range-rate signal. The control signal commands an engine of the host vehicle to start. With such a system, the engine of the host vehicle may turn off when the host vehicle comes to a stop. The engine may remain off until the front vehicle begins to drive away from the host vehicle. As discussed below, the system does not interpret all movement of the front vehicle as the front vehicle driving away from the host vehicle. Thus, the system is able to account for "false positives" that may be triggered by, e.g., the front vehicle moving forward and then stopping again a short distance later, which may occur at a traffic signal or during stop-and-go traffic.

The system shown in the figures may take many different forms and include multiple and/or alternate components and facilities. While an exemplary system is shown, the exemplary components illustrated are not intended to be limiting. Indeed, additional or alternative components and/or implementations may be used.

Figure 1:
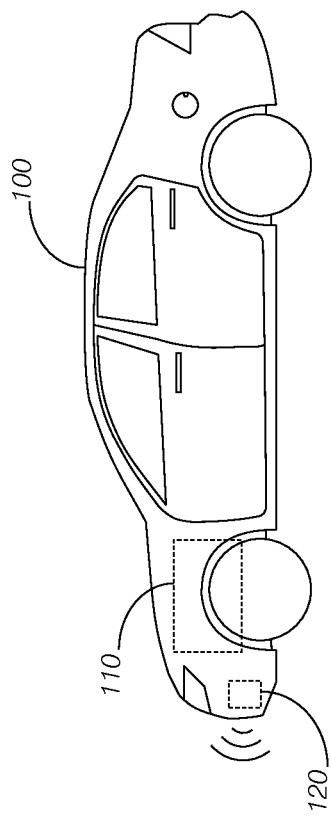
FIG. 1 illustrates a host vehicle having a system for predicting a driver's power demands based on movement of a front vehicle.
Figure 1:
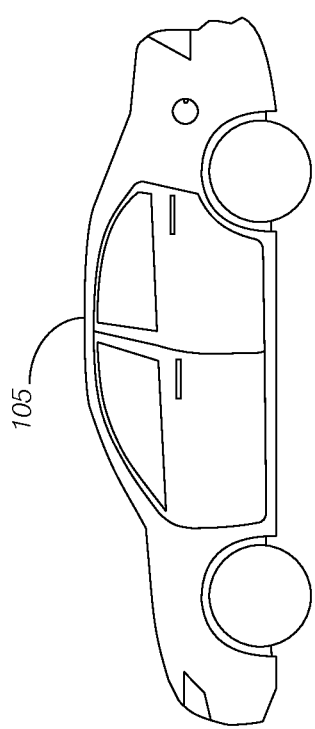

As illustrated in FIG. 1, a host vehicle 100 and a front vehicle 105 are shown. The host vehicle 100 and the front vehicle 105 may be any type of passenger or commercial vehicle such as a car, truck, sport utility vehicle, crossover vehicle, tractor-trailer, etc. While both vehicles are stopped with the host vehicle 100 directly behind the front vehicle 105, the engine 110 of the host vehicle 100 may turn off. While stopped, the host vehicle 100 may monitor the front vehicle 105 for movement. This may include using one or more on-board sensors 120 to determine a distance to the front vehicle 105. This distance may be referred to as the "range" of the front vehicle 105 relative to the host vehicle 100. The same or a different sensor 120 may further determine range-rate information of the front vehicle 105. The range-rate information may include how quickly the front vehicle 105 is moving away from the host vehicle 100. As discussed in greater detail below, the engine 110 of the host vehicle 100 may turn on once the range and range-rate value exceed a predetermined envelope, which may define a relationship between the range and range-rate value where the front vehicle 105 is determined to be moving away from the host vehicle 100. The predetermined envelope may eliminate "false starts," which may otherwise occur when the front vehicle 105 begins to move but then stops again (e.g., the driver of the front vehicle 105 briefly takes his or her foot off the brake and then reapplies the brake to bring the front vehicle 105 to a complete stop again). Thus, the engine 110 of the host vehicle 100 may remain turned off during false starts, continuing to provide fuel economy and emissions benefits despite the relatively minor movement of the front vehicle 105.

Figure 2:
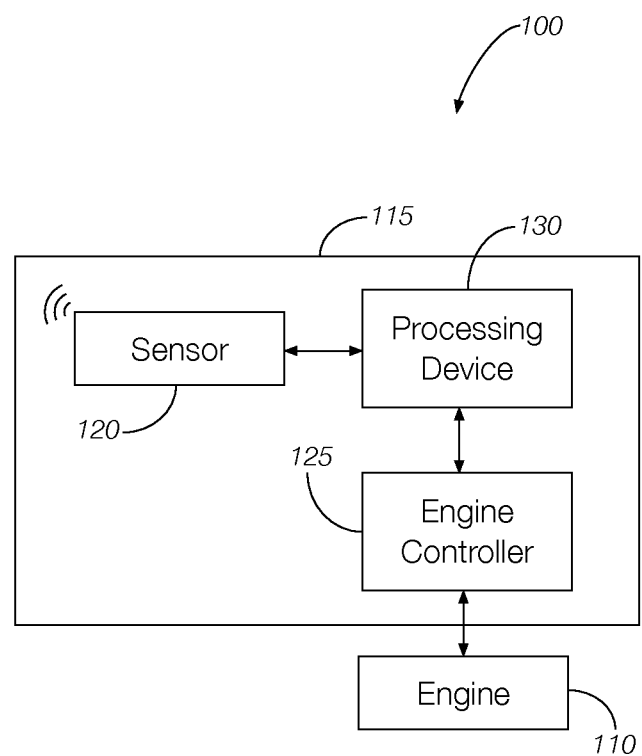
FIG. 2 illustrates an exemplary system for starting an engine of a host vehicle to meet a driver's power demands.

Referring now to FIG. 2, a system 115 incorporated into the host vehicle 100 for determining whether to enable the engine 110 includes at least one sensor 120, an engine controller 125, and a processing device 130.

The sensor 120 may include any number of devices configured to generate signals that allow the host vehicle 100 to "see" one or more other vehicles, such as the front vehicle 105. Examples of sensors 120 may include a radar sensor, a lidar sensor, a camera, or the like. The sensor 120 may be configured to output a range signal based on a distance between the host vehicle 100 and the front vehicle 105. The same or a different sensor 120 may be configured to output a range-rate signal based on the range-rate information of the front vehicle 105.

The engine controller 125 may be configured to control the operation of the engine 110 and possibly other powertrain components, including the transmission. The engine 110 may include an internal combustion engine 110 configured to convert a fuel, such as gasoline, into mechanical motion. The engine 110 may include one or more combustion chambers for oxidizing the fuel. The oxidized fuel may be compressed and ignited in the combustion chamber. The combustion in each chamber may generate a force that drives a piston to rotate a shaft. The engine 110 may include any number of combustion chambers. A cylinder block may define the combustion chambers as well as house the pistons and shaft that make up the engine 110. The cylinder block may be cast from, e.g., iron, an aluminum alloy, or any other material that can transfer heat to engine coolant that runs through the cylinder block. The engine controller 125 may control the combustion timing discussed above. Moreover, the engine controller 125 may be configured to receive inputs from various components and/or subsystems of the host vehicle 100.

The processing device 130 may include any number of devices configured to predict a power demand of the host vehicle 100. One way to predict the power demand is to evaluate the movement of the front vehicle 105 relative to the host vehicle 100 and determine whether to start the engine 110 based on the range represented by the range signal and range-rate information represented by the rangerate signal. If the processing device 130 determines that the engine 110 should be started, the processing device 130 may be configured to output a control signal that commands the engine 110 to start. The control signal may be provided to, e.g., the engine controller 125. In an alternative implementation, the processing device 130 may be incorporated into the engine controller 125 meaning that the engine controller 125 may receive and process the range and range-rate signals, as well as determine whether to start the engine 110 based on those signals. In one possible approach, the processing device 130 may be configured to compare the movement of the front vehicle 105, as represented by the range and range-rate information, to a predetermined envelope and output the control signal commanding the engine 110 to start if the movement of the front vehicle 105 exceeds the predetermined envelope.

The processing device 130 may be configured to remove an initial stop distance (range) before evaluating the movement of the front vehicle 105. Equation 1, below, describes one way the initial stop distance may be removed.

$$\text{range}_{low\text{-}pass}(k) = \alpha \cdot \text{range}_{low\text{-}pass}(k-1) + (1-\alpha) \cdot \text{range}(k)$$

$$\text{range}_m(k) = \text{range}(k) - \text{range}_{low\text{-}pass}(k) \quad (1)$$

The envelope may be compared to the range-rate and the modified range from Equation (1). An example envelope is set forth below as a quadrant circle (Equation (2)).

$$\text{range}_m^2 + \text{rangerate}^2 > \text{radius, if range}_m \text{ and rangerate} \geq 0 \quad (2)$$

In addition to predicting the power demand of the host vehicle 100 and evaluating the movement of the front vehicle 105, the processing device 130 may be further configured to determine whether the host vehicle 100, the front vehicle 105, or both, are stopped. The processing device 130 may determine whether the host vehicle 100 is stopped using a sensor 120 such as a Global Positioning System (GPS) sensor 120 or a speedometer. Alternatively, the processing device 130 may receive a measure of the speed of the wheels or another value representative of the speed of the host vehicle 100. In some instances, the processing device 130 may derive the speed of the host vehicle 100 from one or more sensor 120 values. The processing device 130 may be configured to determine whether the front vehicle 105 is stopped based on the range and/or range-rate signals output by the sensors 120. For instance, the processing device 130 may determine that the front vehicle 105 is stopped if the range-rate of the front vehicle 105 is zero or if the range between the host vehicle 100 and the front vehicle 105 is not changing. In some instances, the processing device 130 may determine whether both the front vehicle 105 and the host vehicle 100 are stopped before deciding whether to turn off or start the engine 110 of the host vehicle 100. Moreover, the processing device 130 may be configured to determine whether the engine 110 of the host vehicle 100 is turned off before attempting to predict any power demands. In other words, the processing device 130 may only evaluate the movement of the front vehicle 105 to, e.g., determine whether to start the engine 110 of the host vehicle 100, if the engine 110 of the host vehicle 100 is turned off.

In general, computing systems and/or devices, such as the processing device 130, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
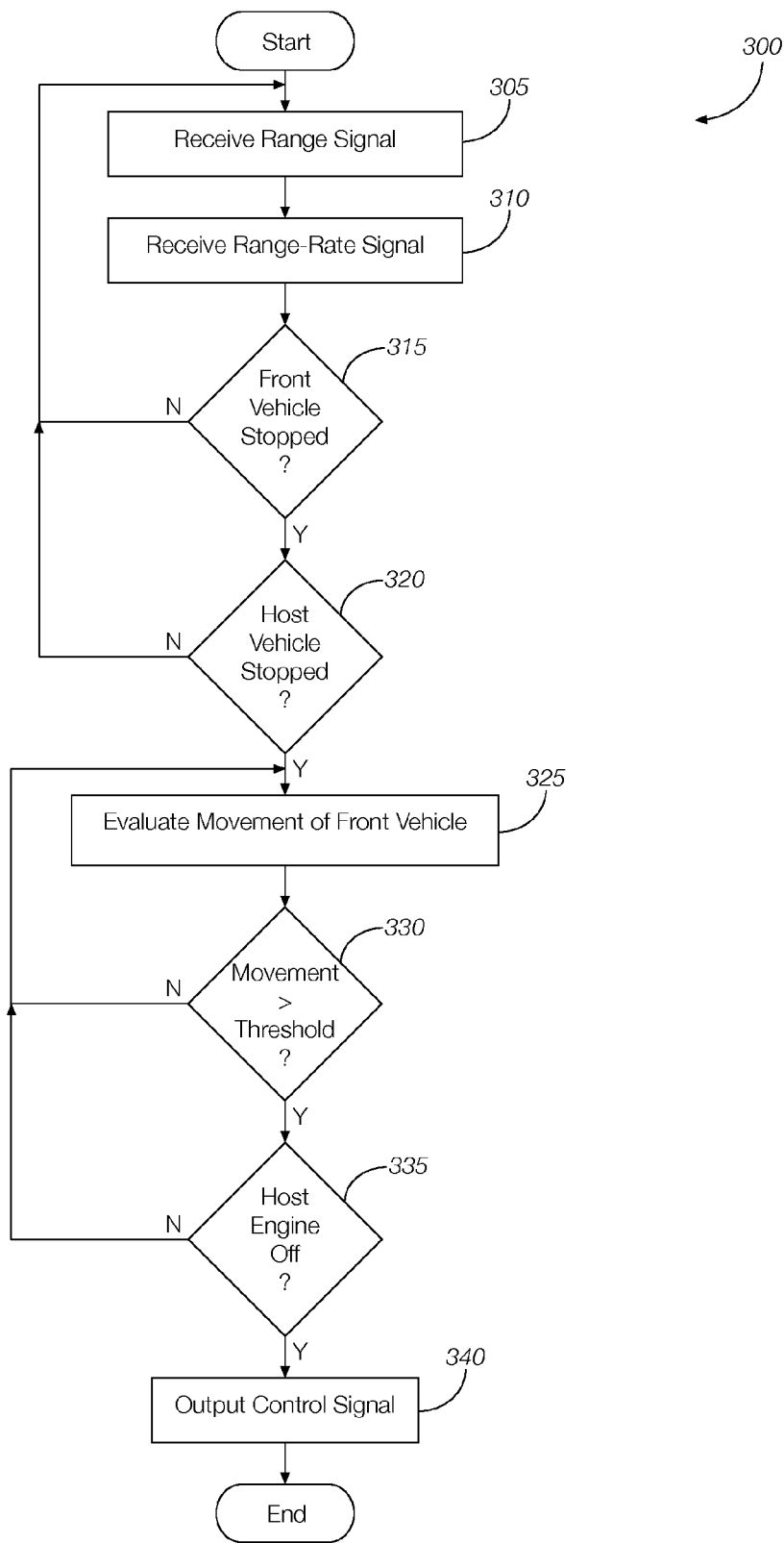
FIG. 3 is a flowchart of an exemplary process that may be used by one or more components of the system of FIG. 2.

FIG. 3 is a flowchart of an exemplary process 300 that may be implemented by one or more components of the system 115 of FIG. 2. For example, the process 300 may be executed by the processing device 130.

At block 305, the processing device 130 may receive the range signal. As discussed above, the range signal may be generated by one or more sensors 120 and may represent a distance between the host vehicle 100 and the front vehicle 105. Further, in some instances, the initial range may be set to zero so that a modified range is considered.

At block 310, the processing device 130 may receive the range-rate signal. The range-rate signal may be generated by one or more sensors 120 and may represent the range-rate information of the front vehicle 105. One example of range-rate information may include how quickly the front vehicle 105 is moving away from the host vehicle 100.

At decision block 315, the processing device 130 may determine whether the front vehicle 105 is stopped. The processing device 130 may determine whether the front vehicle 105 is stopped from the range and/or range-rate signals output by the sensors 120. For instance, the processing device 130 may determine that the front vehicle 105 is stopped if the range-rate of the front vehicle 105 is zero or if the range between the host vehicle 100 and the front vehicle 105 is not changing. If the front vehicle 105 is stopped, the process 300 may continue at block 320. Otherwise, the process 300 may return to block 305.

At decision block 320, the processing device 130 may determine whether the host vehicle 100 is stopped. For instance, the processing device 130 may rely upon a sensor 120 such as a Global Positioning System (GPS) sensor 120 or a speedometer to determine whether the host vehicle 100 is stopped. Alternatively, the processing device 130 may receive a measure of the speed of the wheels or another value representative of the speed of the host vehicle 100. In some instances, the processing device 130 may derive the speed of the host vehicle 100 from one or more sensor 120 values. If the processing device 130 determines that the host vehicle 100 is stopped, the process 300 may continue at block 325. If the processing device 130 determines that the host vehicle 100 is still moving, the process 300 may return to block 305.

At block 325, the processing device 130 may evaluate movement of the front vehicle 105 relative to the host vehicle 100. The evaluation of the movement may be based, at least in part, on additional range and range-rate signals received since determining that the front vehicle 105 is stopped at block 320. As discussed above, an increase in the range (including an increase in the modified range) may suggest that the front vehicle 105 is moving away from the host vehicle 100. The range-rate information of the front vehicle 105 suggests how fast the front vehicle 105 is moving away from the host vehicle 100. As such, the range (including the modified range) and range-rate information can be used to evaluate the movement of the front vehicle 105.

At decision block 330, the processing device 130 may compare the movement of the front vehicle 105 to a predetermined threshold. For instance, the processing device 130 may apply, e.g., Equation (2) to determine whether the range and range-rate suggest that the front vehicle 105 is moving away from the host vehicle 100 in a manner that suggests a high likelihood that the driver of the host vehicle 100 will soon make a power demand. Therefore, if the movement of the front vehicle 105 exceeds the predetermined threshold, the process 300 may continue at block 335. If the movement of the front vehicle 105 does not exceed the predetermined threshold, the process 300 may return to block 325 so that additional movements of the front vehicle 105 may be evaluated.

At decision block 335, the processing device 130 may determine whether the engine 110 of the host vehicle 100 is turned off. The engine 110 may not turn off every time the host vehicle 100 stops. Before commanding the engine 110 to turn on at block 340, the processing device 130 may first confirm that the engine 110 is indeed turned off. If turned off, the process 300 may continue at block 340. If the engine 110 is still on, the process 300 may return to block 325.

At block 340, the processing device 130 may output the control signal that commands the engine 110 of the host vehicle 100 to start. The control signal may be provided to the engine controller 125 so that the engine controller 125 may start the engine 110 in accordance with the control signal.

The process 300 may end after block 340. Alternatively, the process 300 may return to block 305 or possibly another block after block 340.

Figure 4A:
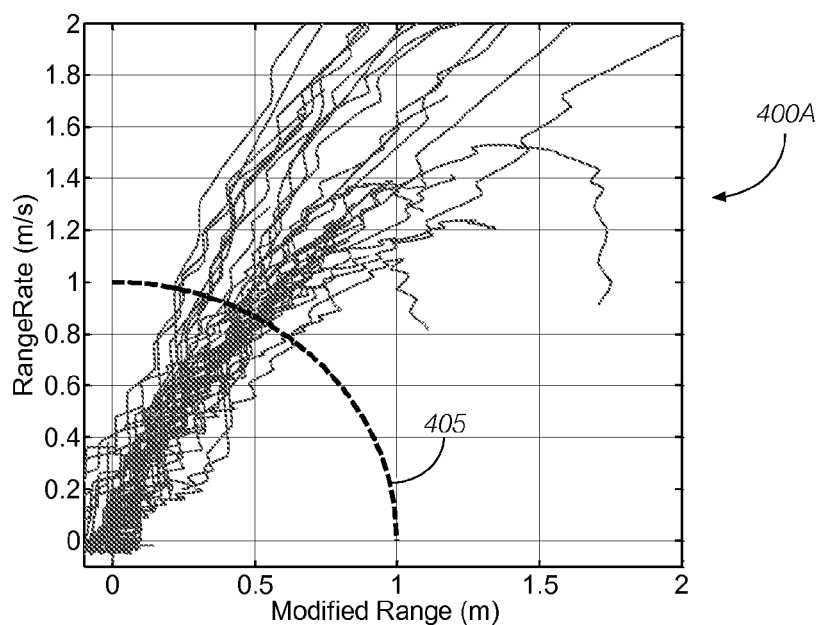
FIG. 4A is a graph showing example range and range-rate data for when the front vehicle is moving away from the host vehicle.
Figure 4B:
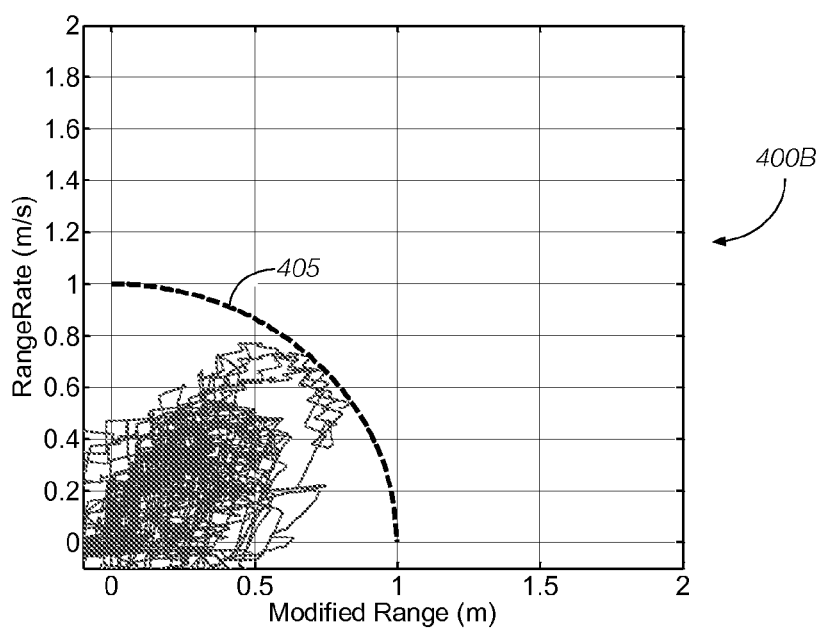
FIG. 4B is a graph showing example range and range-rate data for when the front vehicle moved and then stopped in a manner that should not cause the engine of the host vehicle to start.

FIG. 4A is a graph 400A showing example range and range-rate data for when the front vehicle 105 is moving away from the host vehicle 100. FIG. 4B is a graph 400B showing example range and range-rate data for when the front vehicle 105 moved and then stopped in a manner that should not cause the engine 110 of the host vehicle 100 to start. In both graphs 400A and 400B, the range is represented by the Y-axis and the range-rate is represented by the X-axis. An envelope 405 is shown as a dashed line. Movement of the front vehicle 105 may be represented in the graphs 400A and 400B as a function of both the range and range-rate data. Movement that exceeds the envelope 405, as shown in FIG. 4A, may cause the engine 110 of the host vehicle 100 to start. Movement that falls short of the envelope 405, such as the movement shown in FIG. 4B, may cause the engine 110 to remain off since it is unlikely the driver will demand power from the engine 110 based on the limited movement of the front vehicle 105.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   at least one sensor programmed to output a range signal representing a distance from a host vehicle to a front vehicle and a range-rate signal representing range-rate information of the front vehicle relative to the host vehicle;
   a processing device programmed to output a control signal based on the range signal and the range-rate signal relative to a predetermined envelope defined as a function of the distance from the host vehicle to the front vehicle and the range-rate information, the control signal commanding an engine of the host vehicle to start.

2. The vehicle system of claim 1, wherein the processing device is programmed to evaluate movement of the front vehicle relative to the host vehicle based on the range signal and the range-rate signal.

3. The vehicle system of claim 2, wherein the processing device is programmed to output the control signal if the movement of the front vehicle exceeds the predetermined envelope.

4. The vehicle system of claim 2, wherein the processing device is programmed to predict power demand of the host vehicle based on the movement of the front vehicle.

5. The vehicle system of claim 2, wherein the processing device is programmed to determine whether the host vehicle is stopped and whether the front vehicle is stopped prior to evaluating the movement of the front vehicle.

6. The vehicle system of claim 1, further comprising an engine controller configured to start the engine of the host vehicle in response to receiving the control signal.

7. The vehicle system of claim 1, wherein the processing device is programmed to determine whether the front vehicle is stopped.

8. The vehicle system of claim 1, wherein the processing device is programmed to determine whether the host vehicle is stopped.

9. The vehicle system of claim 1, wherein the processing device is programmed to determine whether the engine of the host vehicle is turned off.

10. A method comprising:
    receiving a range signal representing a distance from a host vehicle to a front vehicle;
    receiving a range-rate signal representing range-rate information of the front vehicle relative to the host vehicle, the range-rate information indicating how quickly the front vehicle is moving relative to the host vehicle;
    evaluating movement of the front vehicle relative to the host vehicle based on a predetermined envelope defined as a function of the distance from the host vehicle to the front vehicle defined by the range signal and the range-rate information defined by the range-rate signal; and
    outputting a control signal to command an engine of the host vehicle to start if the front vehicle is moving away from the host vehicle.

11. The method of claim 10, wherein the control signal is output if the movement of the front vehicle, as defined by the range signal and the range-rate signal, exceeds the predetermined envelope.

12. The method of claim 10, further comprising starting the engine of the host vehicle in accordance with the control signal.

13. The method of claim 10, further comprising determining whether the front vehicle is stopped.

14. The method of claim 13, further comprising determining whether the host vehicle is stopped.

15. The method of claim 14, wherein determining whether the host vehicle is stopped and whether the front vehicle is stopped occurs before evaluating the movement of the front vehicle.

16. The method of claim 10, further comprising determining whether the engine of the host vehicle is turned off.

17. The method of claim 16, wherein the control signal is output if the engine of the host vehicle is turned off.

18. The method of claim 10, wherein the range signal and the range-rate signal are received from at least one sensor located on the host vehicle.

19. A host vehicle comprising:
    an engine;
    at least one sensor configured to detect a front vehicle and output a range signal representing a distance to the front vehicle and a range-rate signal representing range-rate information of the front vehicle relative to the host vehicle, the range-rate information indicating how quickly the front vehicle is moving relative to the host vehicle;
    a processing device programmed to evaluate movement of the front vehicle relative to the host vehicle based on the range signal and the range-rate signal and output a control signal if the movement of the front vehicle exceeds a predetermined envelope defined as a function of the distance represented by the range signal and the range-rate information represented by the range-rate signal; and
    an engine controller configured to start the engine in response to receiving the control signal.

20. The host vehicle of claim 19, wherein the processing device is programmed to predict power demand of the host vehicle based on the movement of the front vehicle.

* * * * *